United States Patent [19]

Kokubu et al.

[11] Patent Number: 4,665,039

[45] Date of Patent: May 12, 1987

[54] POROUS GLASS, PROCESS FOR ITS PRODUCTION AND GLASS MATERIAL USED FOR THE PRODUCTION

[75] Inventors: Yoshinori Kokubu, Tokyo; Jiro Chiba, Yokohama; Kozo Saita, Chiba, all of Japan

[73] Assignee: Asahi Glass Company, Ltd., Tokyo, Japan

[21] Appl. No.: 788,578

[22] Filed: Oct. 17, 1985

[30] Foreign Application Priority Data

Oct. 26, 1984 [JP] Japan ............................ 59-224072

[51] Int. Cl.$^4$ .............................................. C03C 11/00
[52] U.S. Cl. ........................................ 501/39; 501/59; 501/66; 501/67
[58] Field of Search ............ 501/59, 65, 66, 54, 501/69, 67, 39, 35

[56] References Cited

U.S. PATENT DOCUMENTS

| 2,221,709 | 1/1938 | Hood et al. | 501/54 |
| 2,494,259 | 1/1950 | Nordberg | 501/54 |
| 3,513,106 | 5/1970 | Chapman et al. | 65/31 |
| 3,549,524 | 12/1970 | Haller | 210/656 |
| 4,438,211 | 3/1984 | Mennemann et al. | 501/59 |

FOREIGN PATENT DOCUMENTS

| 614373 | 2/1961 | Canada | 501/59 |
| 48-16962 | 5/1973 | Japan | 501/65 |
| 140334 | 8/1982 | Japan. | |
| 58-140341 | 8/1983 | Japan | 501/65 |

OTHER PUBLICATIONS

Kreidl, "Borosilicate Glasses", in Glass, Science and Technology, Ed. by D. R. Uhlman and N. J. Kreidl, (New York, Academic Press, 1983), pp. 171–178.

Primary Examiner—Ferris H. Lander
Attorney, Agent, or Firm—Oblon, Fisher, Spivak, McClelland & Maier

[57] ABSTRACT

A process for producing a porous glass which comprises forming a shaped product of borosilicate glass having a predetermined shape, heat-treating the shaped product for phase separation to form a silica rich insoluble phase and an alkali and boric oxide rich soluble phase, leaching out the soluble phase from the insoluble phase with an acid or an alkali to obtain a porous glass, wherein said shaped product of borosilicate glass is composed essentially of from 45 to 67% by weight of $SiO_2$, from 0.5 to 10% by weight of $Al_2O_3$, from 10 to 30% by weight of $B_2O_3$, from 0.5 to 8% by weight of $Na_2O$, from 0.1 to 8% by weight of $K_2O+Li_2O+Cs_2O$, from 0.5 to 7% by weight of CaO, from 0.5 to 15% by weight of $MgO+BaO+SrO$, from 0 to 10% by weight of $ZrO_2+TiO_2$ and from 0.03 to 3% by weight of $F+SO_3+Cl+As_2O_3+Sb_2O_3$.

5 Claims, 1 Drawing Figure

4,665,039

POROUS GLASS, PROCESS FOR ITS PRODUCTION AND GLASS MATERIAL USED FOR THE PRODUCTION

BACKGROUND OF THE INVENTION

1. Field of the Invention

The present invention relates to a porous glass, a process for its production and a glass material used for the production.

2. Description of the Prior Art

U.S. Pat. No. 2,106,744 discloses a process for producing a porous glass from a borosilicate glass as the starting material, wherein a borosilicate glass composed of $Na_2O$-$B_2O_3$-$SiO_2$, $K_2O$-$B_2O_3$-$SiO_2$ or $Li_2O$-$B_2O_3$-$SiO_2$ is heat-treated for phase separation to form a silica rich insoluble phase and an alkali oxide and boric oxide rich soluble phase, and then the soluble phase is leached out with an acid to separate it from the insoluble phase to obtain a porous glass.

However, by such a process, it is practically difficult to produce a porous glass having a large pore size such as at least 3000 Å. Further, the porous glass thereby obtained is inferior in the alkali resistance, and therefore its application is rather limited.

In Japanese Unexamined Patent Publication No. 140334/1982, it has been proposed to use as the starting material a $SiO_2$-$B_2O_3$-$CaO$-$Al_2O_3$ glass comprising from 5 to 15% by weight of $Al_2O_3$ and from 8 to 25% by weight of CaO as a borosilicate glass to overcome the above-mentioned drawbacks. However, if a porous glass having a pore size of about 5000 Å or less is prepared by using such a glass material, there is a difficulty that cracking and breakage are likely to result during the process of leaching out the soluble phase. Further, the porous glass thereby produced was restricted in its application because the alkali resistance was not adequate and the mechanical strength was rather low.

SUMMARY OF THE INVENTION

The primary object of the present invention is to solve the above difficulties and to provide a process for producing a porous glass, whereby the formation of cracks or breakage during the process of leaching out the soluble phase is minimized.

A further object of the present invention is to provide a process for producing a porous glass, whereby an optional pore size is obtainable within a wide range of from about 50 to 40000 Å.

Another object of the present invention is to provide a porous glass having excellent alkali resistance and high flexural strength.

Still another object of the present invention is to provide a glass material to be used as the starting material for the production of such a porous glass, which has a low vitrification temperature and which can readily be formed into a shaped product.

The primary object of the present invention can be attained by a process for producing a porous glass which comprises forming a shaped product of borosilicate glass having a predetermined shape, heat-treating the shaped product for phase separation to form a silica rich insoluble phase and an alkali and boric oxide rich soluble phase, leaching out the soluble phase from the insoluble phase with an acid or an alkali to obtain a porous glass, wherein said shaped product of borosilicate glass is composed essentially of from 45 to 67% by weight of $SiO_2$, from 0.5 to 10% by weight of $Al_2O_3$, from 10 to 30% by weight of $B_2O_3$, from 0.5 to 8% by weight of $Na_2O$, from 0.1 to 8% by weight of $K_2O$+$Li_2O$+$Cs_2O$, from 0.5 to 7% by weight of CaO, from 0.5 to 15% by weight of $MgO$+$BaO$+$SrO$, from 0 to 10% by weight of $ZrO_2$+$TiO_2$ and from 0.03 to 3% by weight of $F$+$SO_3$+$Cl$+$As_2O_3$+$Sb_2O_3$.

Another object of the present invention can be attained by a porous glass prepared by such a process, which consists essentially of from 60 to 95% by weight of $SiO_2$, from 3 to 20% by weight of $B_2O_3$, from 0.3 to 15% by weight of $Al_2O_3$, from 0.3 to 9% by weight of $Na_2O$, from 0.1 to 9% by weight of $K_2O$+$Li_2O$+$Cs_2O$, from 0.1 to 5% by weight of CaO, from 0.1 to 10% by weight of $MgO$+$BaO$+$SrO$, from 0 to 20% by weight of $ZrO_2$+$TiO_2$ and from 0.01 to 1.0% by weight of $F$+$SO_3$+$Cl$+$As_2O_3$+$Sb_2O_3$.

Still another object of the present invention can be attained by a borosilicate glass useful as a starting material for the production of a porous glass. Said borosilicate glass consists essentially of from 45 to 67% by weight of $SiO_2$, from 0.5 to 10% by weight of $Al_2O_3$, from 10 to 30% by weight of $B_2O_3$, from 0.5 to 8% by weight of $Na_2O$, from 0.1 to 8% by weight of $K_2O$+$Li_2O$+$Cs_2O$, from 0.5 to 7% by weight of CaO, from 0.5 to 15% by weight of $MgO$+$BaO$+$SrO$, from 0 to 10% by weight of $ZrO_2$+$TiO_2$ and from 0.03 to 3% by weight of $F$+$SO_3$+$Cl$+$As_2O_3$+$Sb_2O_3$.

DETAILED DESCRIPTION OF THE PREFERRED EMBODIMENTS

Figure 1:
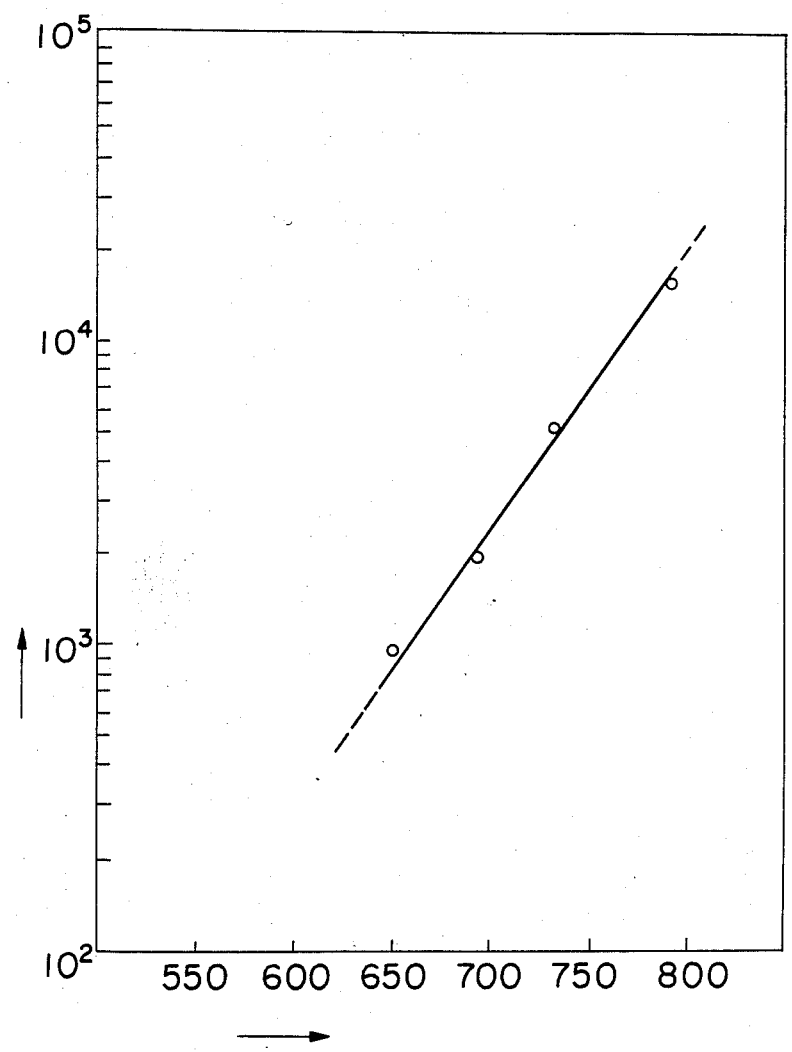
FIG. 1 is a graph showing the relationship between the phase separation temperature and the pore size of the resulting porous product.

Now, the components of the composition of the borosilicate glass as the starting material for a porous glass according to the present invention will be described.

$SiO_2$ is a network former for the glass. If $SiO_2$ is less than 45% by weight, devitrification is likely to result during the melting operation or during the formation of a shaped product. On the other hand, if it exceeds 67% by weight, the viscosity tends to be too high, whereby the melting property tends to be poor, and the characteristics for the phase separation into the soluble phase and the insoluble phase deteriorate, such being undesirable. $SiO_2$ is preferably within a range of from 47 to 65% by weight, more preferably from 47 to 63% by weight, within the above-mentioned range.

Like $SiO_2$, $B_2O_3$ is also a network former for the glass. If $B_2O_3$ is less than 10% by weight, the phase separation into the soluble phase and the insoluble phase will be inadequate, whereby it becomes difficult to obtain the desired porous glass. On the other hand, if it exceeds 30% by weight, the viscosity at a high temperature tends to be high, whereby the melting property and the molding property for the shaped product deteriorate. $B_2O_3$ is preferably within a range of from 12 to 28% by weight, more preferably from 13 to 27% by weight, within the above-mentioned range.

$Al_2O_3$ is incorporated for the purpose of preventing the formation of cracks during the leaching out of the soluble phase and improving the moldability by minimizing the viscosity change relative to the temperature change within the molding range (from about $10^3$ to $10^4$ poise). If $Al_2O_3$ is less than 0.5% by weight, no adequate effectiveness is obtainable, and if it exceeds 10% by weight, the phase separation will be suppressed too much. $Al_2O_3$ is preferably within a range of from 1 to 9% by weight, more preferably from 2 to 7% by weight, within the above-mentioned range.

$Na_2O$ is a flux for melting the glass. If $Na_2O$ is less than 0.5% by weight, the melting property deteriorates, and the viscosity in the molding temperature range tends to be too high, whereby the moldability deteriorates. On the other hand, if the amount exceeds 8% by weight, the viscosity in the molding temperature range tends to be too low, such being undesirable. $Na_2O$ is preferably within a range of from 1 to 7% by weight, more preferably from 2 to 6% by weight, within the above-mentioned range.

$K_2O$, $Li_2O$ and $Cs_2O$ are incorporated for the same purpose as $Na_2O$. By using them in combination with $Na_2O$, the control of the above-mentioned properties will be easy. If the total amount of these components is less than 0.1% by weight, no substantial effectiveness will be obtained. On the other hand, if the total amount exceeds 8% by weight, the viscosity tends to be too low, whereby the moldability deteriorates. Thus, either case is undesirable. Within the above-mentioned range, preferred is a range of from 0.2 to 7%, and particularly preferred is a range of from 0.5 to 6% by weight.

CaO is incorporated to facilitate the phase separation. If CaO is less than 0.5% by weight, the effectiveness tends to be little, and if the amount exceeds 7% by weight devitrification is likely to take place, and the viscosity change due to the temperature change in the molding range tends to be too great, whereby the moldability deteriorates substantially. Within the above-mentioned range, preferred is a range of from 1 to 6% by weight, and particularly preferred is a range of from 2 to 5.5% by weight.

MgO, BaO and SrO are incorporated to facilitate the phase separation like CaO. By the combination of these components with CaO, it is possible to lower the devitrification temperature. If the total amount of these components is less than 0.5% by weight, their effectiveness is little, and if the total amount exceeds 15% by weight, devitrification tends to take place during the melting operation. Within the above-mentioned range, preferred is a range of from 1 to 14% by weight, and particularly preferred is a range of from 2 to 13% by weight.

$ZrO_2$ and $TiO_2$ are not essential components. However, by their incorporation, the viscosity change due to the temperature change within the molding range can be reduced, and the soluble phase formed during the phase separation step can be made continuous and curved, whereby the alkali resistance of the porous glass can be improved. If the total amount of these components exceeds 10% by weight, vitrification tends to be difficult, such being undesirable. Preferred is a range of from 0.5 to 7% by weight, and particularly preferred is a range of from 1 to 5% by weight.

F, $SO_3$, Cl, $As_2O_3$ and $Sb_2O_3$ are incorporated as clarifiers for the molten glass. If the total amount of these components is less than 0.03% by weight, no such effectiveness will be obtained, and if the total amount exceeds 3% by weight, devitrification is likely to result, such being undesirable. Preferred is a range of from 0.05 to 0.7% by weight, and particularly preferred is a range of from 0.1 to 0.5% by weight.

It is preferred that at least 98% by weight of the borosilicate glass constituting the shaped product is constituted by the above-mentioned components. The rest of less than 2% by weight may be constituted by such components as $Fe_2O_3$, CoO, $MnO_2$, $MoO_3$, $WO_3$ and the like, whereby the characteristics such as a color tone may be improved.

The shaped product of such borosilicate glass may be formed as follows.

Starting materials are blended to make up the intended composition and thus to form a batch. Then, this batch is supplied to a melting furnace and heated at a temperature of from 1300° to 1550° C. for two to four hours for melting and vitrification. For this melting operation, it is desirable to adequately stir the molten glass by a stirrer or bubbler to prevent the formation of non-uniform portions such as striae which lead to a wide distribution of the pore size of the porous glass. Then, the molten glass is formed into a desired shape such as a rod shape, a tubular shape or a sheet form in a usual method, followed by a gradual cooling, whereby a shaped product of borosilicate glass having a predetermined shape is obtainable. The gradual cooling of this shaped product is preferably conducted so that the residual stress would be as great as possible within the range where non-breakage in the subsequent operation or the cutting defect in the cutting operation will result, with a view to an improvement of the productivity. More specifically, in the case of a shaped product having a thickness of 1 mm, the cooling can be conducted at a rate of about 1° C./min within a temperature range of from 500° to 600° C.

For the preparation of a porous glass from the shaped product of borosilicate glass thus formed, the shaped product is firstly heated for phase, separation to form a silica rich insoluble phase and an alkali and boric oxide rich soluble phase. This heating temperature is preferably within a range of from 550° to 800° C., more preferably from 550° to 750° C. If the temperature is lower than the above range, no substantial phase separation takes place, or the speed for the phase separation will be extremely slow, such being undesirable. On the other hand, if the temperature exceeds the above range, the shaped product tends to undergo a flow deformation, such being undesirable.

For the same composition, the higher the heating temperature, the greater the soluble phase, and the greater the pore size of the resulting porous glass.

The heating time for the phase separation is usually from 1 to 50 hours. If the heating time is too short, no adequate phase separation will be conducted. On the other hand, if the time is too long, the productivity will be reduced.

The shaped product thus subjected to phase separation is preferably immersed in a hydrofluoric acid solution to remove the stains formed on the surface during the phase separation process, before the step of the leaching out of the soluble phase. This treatment is conducted usually by dipping the shaped product in a solution containing from 2 to 10% of hydrofluoric acid for from 2 to 15 minutes.

Then, the shaped product is immersed in an acid or alkaline solution to leach out the soluble phase from the insoluble phase to obtain a porous glass. The solution used here is not particularly limited so long as it is capable of leaching out the soluble phase without eroding the insoluble phase. Among them, an acid such as $H_2SO_3$, HCl or $HNO_3$ or an alkali such as NaOH or $NH_4OH$ is particularly preferred since they are readily available and easy to handle. The concentration of these solutions is preferably from 0.01 to 1N. If the concentration is too low, it takes long time for the leaching out of the soluble phase. On the other hand, if the concentration is too high, the silica rich insoluble phase is likely to be eroded.

These solutions are preferably maintained at a temperature of from 80° to 90° C. to facilitate the leaching out of the soluble phase.

With respect to the time for the immersion of the shaped product, it is possible to adequately leach out the soluble phase within a period of from 5 to 50 hours in a case where the thickness of the shaped product is about 1 mm.

In a porous glass thus prepared by the leaching out of the soluble phase, a part of the soluble phase is gelled and remains in the pores. In order to remove it, it is preferred that after the leaching operation, the porous glass is further immersed in an acid such as HCl or $H_2SO_4$ or in an alkaline solution such as NaOH or KOH for from 1 to 5 hours, and then washed with water. For this purpose, these solutions usually have a concentration of from 0.001 to 0.1N and maintained at a temperature of from 30° to 50° C., whereby the intended objective can adequately be attained.

The porous glass thus obtained and having the following composition is particularly preferred since it has high flexural strength and excellent alkali resistance. Namely, the porous glass consists essentially of the following components, the proportions of which are represented by percent by weight:

$SiO_2$: 60–95
$B_2O_3$: 3–20
$Al_2O_3$: 0.3–15
$Na_2O$: 0.3–9
$K_2O + Li_2O + Cs_2O$: 0.1–9
$CaO$: 0.1–5
$MgO + BaO + SrO$: 0.1–10
$ZrO_2 + TiO_2$: 0–20
$F + SO_3 + Cl + As_2O_3 + Sb_2O_3$: 0.01–1.0

The reasons for the restrictions of the components for the porous glass are as follows.

If $SiO_2$ is too little, the heat resistance and chemical durability deteriorate, and if the amount is too much, the alkali resistance deteriorates. Preferred is a range of from 65 to 95% by weight.

If $Al_2O_3$ is too little, the chemical durability tends to be poor, and if the amount is excessive, the heat resistance decreases and the moldability deteriorates. Preferred is a range of from 0.5 to 10% by weight.

If $B_2O_3$ is too little, the step for the leaching out of the soluble phase tends to be complicated, and if the amount is excessive, the heat resistance tends to be poor.

If $Na_2O$, $K_2O$, $Li_2O$ and $Cs_2O$ are too little, the acid resistance will be poor, and it becomes difficult to control the thermal expansion coefficient. If the total amount is excessive, the water resistance tends to deteriorate.

If CaO, MgO, BaO and SrO are too little, the step for the formation of pores will be complicated, and if they are too much, the alkali resistance and heat resistance tend to be poor.

$ZrO_2$ and $TiO_2$ are not essential components. However, by their incorporation, the alkali resistance can further be improved. However, if their amount is excessive, it takes long time for the leaching operation, such being undesirable.

Now, the present invention will be described with reference to Examples. However, it should be understood that the present invention is by no means restricted by these specific Examples.

EXAMPLES

The starting materials are mixed to obtain a batch having the desired composition as specified in Table 1. Then, this batch was put in a crucible, and heated to a temperature of from 1300° to 1450° C. in an electric furnace, and melted under stirring to obtain a uniform molten glass.

Then, this molten glass was molded into a rod having a diameter of 2 mm, and held at a temperature of from 470° to 530° C. for 1 hour in an electric furnace, and then left to cool in the furnace. The moldability and the devitrification temperature measured with respect to this rod are shown in Table 1.

Then, this rod was heated at 650° C. for 30 hours in an electric furnace for phase separation treatment. Then, the rod was dipped for from 5 to 10 minutes in 5–10% hydrofluoric acid for etching treatment, and then the rod was immersed in 1N sulfuric acid at 90° C. for 20 hours for leaching treatment. Then, this rod was immersed in 1N hydrochloric acid or in 0.01–0.5N NaOH for 5 hours to remove the gel remaining in the pores, followed by washing with water to obtain a porous rod. With respect to the porous glass, the composition, the pore diameter, the pore volume, the yield, the flexural strength and the alkali resistance were measured. The results are shown in Table 2. Further, the presence or absence of cracking during the leaching operation and the composition are also presented in the Table.

Further, as Comparative Examples, similar tests were conducted with respect to those other than the present invention, and the results are also shown in the same Table (see Sample Nos. Y and Z).

The properties in the Table were measured as follows.

Rod moldability:

In a molten glass, a quartz rod having a diameter of 10 mm was dipped and pulled out at a rate of 5 cm/sec, and the drawing distance (cm) at a predetermined temperature (1100° C.) was evaluated. The factors affecting the moldability includes the viscosity, devitrification and phase separation properties. Particularly, devetrification or phase separation is undesirable during the molding operation.

Pore diameter, pore volume:

Measured by a porosimeter of mercury injection type manufactured by Shimadzu Corporation.

Flexural strength:

The porous glass was cut into a piece having a thickness T of 1 mm, a width W of 3 mm and a length of 40 mm. This piece was placed on two fulcra spaced with a distance L of 20 mm, and a load was exerted at the center between the two fulcra at a rate of 5 mm/min, and the load P at the breakage was obtained. The flexural strength $\sigma$ was calculated in accordance with the following equation.

$$\sigma = (3PL/2WT^2)$$

The values shown in Table 2 were average values of ten samples.

Yield:

The yield was determined by measuring the weights before and after the leaching out.

Alkali resistance:

The sample was immersed in 1N sodium hydroxide at 40° C. for 10 hours, and then the surface was observed with naked eyes. The one having cracks or peeling on the surface layer is designated by X, the one having a slight degree of cracks or peeling is designated by Δ, and the one having no cracks or peeling is designated by O.

On the other hand, FIG. 1 shows a relationship between the phase separation treating temperature and the pore diameter as measured with respect to the above composition E. It is evident from the Figure that the lower the temperature for phase separation treatment, the smaller the pore diameter, and once the composition is determined, the temperature for phase separation treatment is determined by the desired pore diameter.

The borosilicate glass constituting the shaped product according to the present invention has a low devetrification temperature and excellent moldability, whereby a shaped product having a relatively complex shape can readily be molded.

The porous glass prepared in accordance with the present invention is useful as a diaphragm for the separation of gases and liquids or as a carrier for catalysts.

What is claimed is:

1. A process for producing a porous glass which comprises forming a shaped product of borosilicate glass having a predetermined shape, heat-treating the

TABLE 1

| | | A | B | C | D | E | F | G | H | I | J | K | Y | Z |
|---|---|---|---|---|---|---|---|---|---|---|---|---|---|---|
| Composition of a rod (wt. %) | $SiO_2$ | 64 | 60 | 59 | 48 | 50 | 50 | 47 | 47 | 60 | 48 | 48 | 50 | 48.5 |
| | $Al_2O_3$ | 1 | 2 | 2 | 4 | 6 | 8 | 2 | 1 | 3 | 3 | 2 | 9 | 3 |
| | $B_2O_3$ | 13 | 25.5 | 15 | 26 | 22 | 18 | 16 | 17 | 16 | 28 | 28 | 18 | 20 |
| | $Na_2O$ | 2 | 4 | 2 | 3 | 6 | 6 | 6 | 5 | 7 | 7 | 4 | 6 | 7 |
| | $K_2O$ | 0 | 0 | 1 | 0 | 0 | 1.0 | 5 | 0 | 0 | 0 | 0 | 3 | 2 |
| | $Li_2O$ | 0 | 2 | 6 | 3 | 1 | 0.5 | 0 | 6 | 0 | 0 | 4 | 0 | 1 |
| | $Cs_2O$ | 6 | 0 | 0 | 3 | 0.5 | 0 | 0 | 0 | 6 | 6 | 0 | 0 | 0 |
| | CaO | 1 | 1.5 | 2 | 3 | 4 | 6 | 5 | 5 | 5 | 5 | 1.5 | 14 | 12 |
| | MgO | 0 | 0 | 0 | 8 | 2 | 2 | 4 | 4 | 2 | 2 | 10 | 0 | 6 |
| | BaO | 12.5 | 1.5 | 0 | 0 | 5 | 1 | 4 | 4 | 0 | 0 | 0 | 0 | 0 |
| | SrO | 0 | 0 | 12.5 | 0 | 0 | 2 | 4 | 4 | 0 | 0 | 0 | 0 | 0 |
| | $ZrO_2$ | 0 | 1.5 | 0 | 0 | 3 | 3 | 0 | 6.5 | 0.5 | 0 | 2 | 0 | 0 |
| | $TiO_2$ | 0 | 1.5 | 0 | 1.5 | 0 | 2 | 6.5 | 0 | 0 | 0.5 | 0 | 0 | 0 |
| | F | 0.5 | 0 | 0 | 0 | 0 | 0 | 0 | 0 | 0 | 0 | 0.5 | 0 | 0 |
| | $SO_3$ | 0 | 0.3 | 0 | 0.5 | 0.3 | 0.3 | 0 | 0 | 0 | 0 | 0 | 0 | 0 |
| | Cl | 0 | 0 | 0 | 0 | 0.2 | 0.2 | 0 | 0 | 0.5 | 0.5 | 0 | 0 | 0 |
| | $As_2O_3$ | 0 | 0.2 | 0 | 0 | 0 | 0 | 0.5 | 0.5 | 0 | 0 | 0 | 0 | 0.5 |
| | $Sb_2O_3$ | 0 | 0 | 0.5 | 0 | 0 | 0 | 0 | 0 | 0 | 0 | 0 | 0 | 0 |
| Devitrification temperature (°C.) | | 940 | 935 | 930 | 880 | 940 | 930 | 900 | 910 | 910 | 920 | 940 | 999 | 1100 |
| Rod Moldability (cm) | | 90 | 95 | 100 | 140 | 140 | 130 | 130 | 130 | 120 | 130 | 120 | 45 | 50 |

TABLE 2

| | | A | B | C | D | E | F | G | H | I | J | K | Y | Z |
|---|---|---|---|---|---|---|---|---|---|---|---|---|---|---|
| Composition of a porous glass (wt. %) | $SiO_2$ | 87 | 85 | 75 | 64 | 71 | 70 | 67 | 66 | 77 | 69 | 69 | 67 | 80 |
| | $Al_2O_3$ | 0.5 | 1 | 5 | 6 | 1 | 1 | 3 | 2 | 4 | 6 | 4 | 12 | 1.5 |
| | $B_2O_3$ | 4.5 | 6 | 11 | 15 | 12 | 10 | 8 | 8 | 8 | 15 | 16 | 9 | 10 |
| | $Na_2O$ | 1 | 1 | 1 | 3.5 | 5 | 5 | 3 | 3 | 2 | 2 | 2 | 6 | 2.5 |
| | $K_2O$ | | | 0.5 | | | 1 | 4 | | | | | 3 | 1 |
| | $Li_2O$ | | 1 | 2 | 1.0 | 1 | | | 3 | | | 1 | | 0.5 |
| | $Cs_2O$ | 4 | | | 3.0 | | | | | 4 | 3 | | | |
| | CaO | <0.1 | 1 | 0.5 | 1 | 2 | 2 | 2 | 2 | 2 | 2 | 1 | 3 | 2.5 |
| | MgO | | | | 4 | | 1 | 1 | 2 | 1 | 1 | 3 | | 2 |
| | BaO | 3 | 1 | | | 2 | | 3 | 3 | | | | | |
| | SrO | | | 5 | | | 1 | 2 | 2 | | | | | |
| | $ZrO_2$ | | 2 | | | 6 | 5 | | 9 | 2 | | 4 | | |
| | $TiO_2$ | | 2 | | 2.5 | | 4 | 7 | | | 2 | | | |
| | F | <0.1 | | | | | | | | | | <0.1 | | |
| | Cl | | | | | | | | | | | | | |
| | $As_2O_3$ | | | | | | | <0.1 | <0.1 | <0.1 | <0.1 | | | |
| | $Sb_2O_3$ | | | <0.1 | | | | | | | | | | |
| Cracking during the leaching treatment | | None | None | None | None | None | None | None | None | None | None | None | Observed | Observed |
| Pore diameter (Å) | | <1000 | <1000 | 4000 | 6000 | 2000 | 3000 | 7000 | 5000 | 20000 | 10000 | 10000 | 2000 | 3000 |
| Pore volume (cc/g) | | 0.5 | 0.42 | 0.48 | 0.42 | 0.37 | 0.39 | 0.52 | 0.53 | 0.45 | 0.50 | 0.50 | 0.40 | 0.42 |
| Yield (%) | | 45 | 45 | 43 | 40 | 42 | 40 | 40 | 40 | 45 | 40 | 40 | 33 | 35 |
| Fluxural strength (kg/cm$^2$) | | 1000 | 1000 | 1000 | 1500 | 1200 | 1100 | 1200 | 1200 | 1200 | 1200 | 1100 | 900 | 950 |
| Alkali resistance | | O | O | O | O | O | O | O | O | O | O | O | Δ | Δ |

As is evident from the Table, according to the present invention, no breakage is likely during the process for leaching out the soluble phase from the shaped product.

The porous glass produced by the present invention has high flexural strength and excellent alkali resistance.

shaped product for phase separation to form a silica rich insoluble phase and an alkali and boric oxide rich soluble phase, leaching out the soluble phase from the insoluble phase with an acid or an alkali to obtain a porous glass, wherein said shaped product of borosilicate glass is consisting essentially of from 45 to 67% by weight of $SiO_2$, from 0.5 to 10% by weight of $Al_2O_3$, from 10 to 30% by weight of $B_2O_3$, from 0.5 to 8% by weight of $Na_2O$, from 0.1 to 8% by weight of $K_2O+Li_2O+Cs_2O$, from 0.5 to 7% by weight of CaO, from 0.5 to 15% by weight of $MgO+BaO+SrO$, from 0 to 10% by weight of $ZrO_2+TiO_2$ and from 0.03 to 3% by weight of $F+SO_3+Cl+As_2O_3+Sb_2O_3$.

2. The process according to claim 1, wherein the shaped product of borosilicate glass is consisting essentially of from 47 to 65% by weight of $SiO_2$, from 1 to 9% by weight of $Al_2O_3$, from 12 to 28% by weight of $B_2O_3$, from 1 to 7% by weight of $Na_2O$, from 0.2 to 7% by weight of $K_2O+Li_2O+Cs_2O$, from 1 to 6% by weight of CaO, from 1 to 14% by weight of $MgO+BaO+SrO$, from 0.5 to 7% by weight of $ZrO_2+TiO_2$ and from 0.05 to 0.7% by weight of $F+SO_3+Cl+As_2O_3+Sb_2O_3$.

3. The process according to claim 1, wherein the shaped product of borosilicate glass is consisting essentially of from 47 to 63% by weight of $SiO_2$, from 2 to 7% by weight of $Al_2O_3$, from 13 to 27% by weight of $B_2O_3$, from 2 to 6% by weight of $Na_2O$, from 0.5 to 6% by weight of $K_2O+Li_2O+Cs_2O$, from 2 to 5.5% by weight of CaO, from 2 to 13% by weight of $MgO+BaO+SrO$, from 1 to 5% by weight of $ZrO_2+TiO_2$ and from 0.1 to 0.5% by weight of $F+SO_3+Cl+As_2O_3+Sb_2O_3$.

4. A porous glass prepared by heating a shaped product of borosilicate glass consisting essentially of from 45 to 67% by weight of $SiO_2$, from 0.5 to 10% by weight of $Al_2O_3$, from 10 to 30% by weight of $B_2O_3$, from 0.5 to 8% by weight of $Na_2O$, from 0.1 to 8% by weight of $K_2O+Li_2O+Cs_2O$, from 0.5 to 7% by weight of CaO, from 0.5 to 15% by weight of $MgO+BaO+SrO$, from 0 to 10% by weight of $ZrO_2+TiO_2$ and from 0.03 to 3% by weight of $F+SO_3+Cl+As_2O_3+Sb_2O_3$ for phase separation to form a silica rich insoluble phase and an alkali and boric oxide rich soluble phase, and then leaching out the soluble phase from the insoluble phase with an acid or an alkali, said porous glass consisting essentially of from 60 to 95% by weight of $SiO_2$, from 3 to 20% by weight of $B_2O_3$, from 0.3 to 15% by weight of $Al_2O_3$, from 0.3 to 9% by weight of $Na_2O$, from 0.1 to 9% by weight of $K_2O+Li_2O+Cs_2O$, from 0.1 to 5% by weight of CaO, from 0.1 to 10% by weight of $MgO+BaO+SrO$, from 0 to 20% by weight of $ZrO_2+TiO_2$ and from 0.01 to 1.0% by weight of $F+SO_3+Cl+As_2O_3+Sb_2O_3$.

5. The porous glass according to claim 4, which consists essentially of from 65 to 95% by weight of $SiO_2$, from 3 to 20% by weight of $B_2O_3$, from 0.3 to 10% by weight of $Al_2O_3$, from 0.3 to 9% by weight of $Na_2O$, from 0.1 to 9% by weight of $K_2O+Li_2O+Cs_2O$, from 0.1 to 5% by weight of CaO, from 0.1 to 10% by weight of $MgO+BaO+SrO$, from 0 to 20% by weight of $ZrO_2+TiO_2$ and from 0.01 to 1.0% by weight of $F+SO_3+Cl+As_2O_3+Sb_2O_3$.

* * * * *